(12) United States Patent
Milford

(10) Patent No.: US 9,390,257 B2
(45) Date of Patent: Jul. 12, 2016

(54) DETECTION OF UNEXPECTED SERVER OPERATION THROUGH PHYSICAL ATTRIBUTE MONITORING

(75) Inventor: Peter N. Milford, Los Gatos, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 82 days.

(21) Appl. No.: 13/640,307

(22) PCT Filed: Apr. 4, 2012

(86) PCT No.: PCT/US2012/032159
§ 371 (c)(1),
(2), (4) Date: Oct. 9, 2012

(87) PCT Pub. No.: WO2013/151544
PCT Pub. Date: Oct. 10, 2013

(65) Prior Publication Data
US 2013/0269030 A1    Oct. 10, 2013

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| G06F 21/50 | (2013.01) | |
| G06F 11/34 | (2006.01) | |
| G06F 11/30 | (2006.01) | |
| G06F 21/55 | (2013.01) | |

(52) U.S. Cl.
CPC ............ *G06F 21/50* (2013.01); *G06F 11/3058* (2013.01); *G06F 11/3409* (2013.01); *G06F 21/554* (2013.01); *G06F 2201/81* (2013.01)

(58) Field of Classification Search
CPC ....... G06F 11/30; G06F 11/079; G06F 11/22; G06F 2201/81; H04L 63/14
USPC ................. 726/22–25; 714/25–27, 47.1–47.3
See application file for complete search history.

(56) References Cited

U.S. PATENT DOCUMENTS

| | | | |
|---|---|---|---|
| 7,058,015 | B1 | 6/2006 | Wetherall et al. |
| 7,321,523 | B2 | 1/2008 | Ke |
| 7,493,193 | B2 | 2/2009 | Hyland et al. |

(Continued)

OTHER PUBLICATIONS

Tricorder: A mobile sensor network browser Joshua Lifton et al. Proceedings of the ACM CHI 2007 conference, Mobile Spatial Interaction workshop, San Jose, CA, Apr. 28-May 3, 2007.*

(Continued)

*Primary Examiner* — Dede Zecher
*Assistant Examiner* — Vadim Savenkov
(74) *Attorney, Agent, or Firm* — Turk IP Law, LLC

(57) ABSTRACT

Technologies are generally presented for identifying inconsistent usage of computing devices in a multiple computing device environment. When software or hardware are compromised or faulty, the results of self-monitoring may be unreliable for determining inconsistent usage arising from a security breach, a hardware fault, or a software error. Computing devices may be independently monitored for physical attributes, such as temperature, vibration, emitted noise, etc., and such attributes may be compared to expected values based on computing load, network load, or the like. When the monitored and expected physical attribute values differ or conflict, possible inconsistent usage may be identified so that appropriate measures may be taken to rectify the situation.

20 Claims, 7 Drawing Sheets

(56) References Cited

U.S. PATENT DOCUMENTS

| | | | | |
|---|---|---|---|---|
| 7,877,621 | B2* | 1/2011 | Jacoby et al. | 726/24 |
| 8,285,844 | B2* | 10/2012 | Hussaini et al. | 709/224 |
| 2006/0287972 | A1* | 12/2006 | Kelso et al. | 707/1 |
| 2007/0067678 | A1 | 3/2007 | Hosek et al. | |
| 2007/0198679 | A1* | 8/2007 | Duyanovich | G06F 11/3409 709/223 |
| 2008/0304233 | A1 | 12/2008 | Rozzi et al. | |
| 2009/0144584 | A1* | 6/2009 | Rowles | G06F 11/0793 714/25 |
| 2009/0282230 | A1 | 11/2009 | Vaidyanathan et al. | |
| 2010/0050008 | A1* | 2/2010 | Allalouf | G06F 1/32 713/340 |
| 2010/0154057 | A1 | 6/2010 | Ko et al. | |
| 2010/0204960 | A1* | 8/2010 | Hagadone et al. | 702/188 |
| 2010/0229016 | A1* | 9/2010 | Kodama et al. | 713/340 |
| 2011/0055669 | A1* | 3/2011 | DeHaan et al. | 714/799 |
| 2011/0072293 | A1 | 3/2011 | Mazzaferri et al. | |
| 2011/0173496 | A1 | 7/2011 | Hosek et al. | |
| 2012/0011378 | A1 | 1/2012 | Dalton et al. | |
| 2012/0166143 | A1* | 6/2012 | Brown | G06F 11/3062 702/188 |

OTHER PUBLICATIONS

A Mobile Client Platform for Sensor Networks Phillip Stanley-Marbell ESR-2008-04 Jan. 24, 2008.*

Sandeep et al., Thermal Management of Data Centers Through Termal-Aware Job Scheduling; Data center thermal management energy efficient task scheduling placement; http://impact.asu.edu/~mcn/DataCenter.htm, Aug. 28, 2009.

Tang, et al., Energy-Efficient, Thermal-Aware Task Scheduling for Homogeneous, High Performance Computing Data Centers: A Cyber-Physical Approach; This work is supported in part by grants from Intel Corporation, Science Foundation Arizona and National Science Foundation (CNS#0649868). A preliminary version of this paper appeared in IEEE Cluster 2007[1]. http://impact.asu.edu/~mcn/publication/tang-TPDS-SI-PAPADS.pdf.

Data Center Knowledge, NTT Communications; http://www.datacenterknowledge.com/archives/2011/04/22/video-googles-data-center-security/, Apr. 22, 2011.

International Search Report and Written Opinion for PCT/US12/32159, filed Apr. 4, 2012, mailed on Jul. 13, 2012.

International Preliminary Report on Patentability for PCT/US2012/032159 filed Apr. 4, 2012, mailed on Oct. 16, 2014, issued Oct. 7, 2014.

"How to Monitor CPU Tempeature," accessed at https://web.archive.org/web/20120125193211/http://www.tech-faq.com/how-to-monitor-cpu-temperature.html, accessed on Jan. 7, 2015, pp. 1-5.

Ye, N., and Farley, T., "A Scientific Approach to Cyberattack Detection" IEEE Computer Society, vol. 38, Issue 11, pp. 55-61 (Nov. 2005).

* cited by examiner

DETECTION OF UNEXPECTED SERVER OPERATION THROUGH PHYSICAL ATTRIBUTE MONITORING

CROSS-REFERENCE TO RELATED APPLICATION

This Application is the National Stage filing under 35 U.S.C. 371 of PCT Application Ser. No. PCT/US12/32159 filed on Apr. 4, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Distributed computing systems such as data centers, server farms, cluster computers, grid computing systems, cloud computer systems, and the like, may include many racks of computers, and perhaps thousands of computers. Computing loads may be distributed across such computing systems in many ways, and may be monitored by system job management tools. Security is an important consideration for such computing systems, and much effort is expended in preventing, detecting, and mitigating security breaches. There is much interest in countering such security breaches because of the potential damage to software, data, and hardware; economic costs of lost business and compromised records; and even effects on corporate and national security. Further, even a security breach that does no direct damage to computing systems may still impose significant energy usage costs if the breach is not detected.

If such a computing system has been compromised by a security breach, it is possible that programs running on the computing system may be compromised, including security applications and system job management tools. It is possible that a security breach by rogue processes may not be reported by compromised security applications, and further, that the computational load imposed by rogue processes may not be reported by compromised system job management tools. A security breach may potentially go undetected for a period of time when security applications and system job management tools may be compromised.

The present disclosure appreciates that detecting a computer security breach may be a challenging endeavor.

SUMMARY

The present disclosure generally describes technologies for detection of unexpected server operation through physical attribute monitoring servers and related devices.

According to some examples, a method for identifying inconsistent use of computing devices is provided. The method may include: determining an expected value for a physical attribute of a computing device based on an operational mode of the computing device; monitoring the physical attribute of the computing device to detect a present value; and if the detected value differs from the expected value, identifying the computing device as being in an inconsistent use mode.

According to some examples, a monitoring apparatus for identifying inconsistent use of computing devices is provided. The monitoring apparatus may include a memory and a processor coupled to the memory. The processor may be configured to: determine an expected value for a physical attribute of a computing device based on an operational mode of the computing device; monitor the physical attribute of the computing device to detect a present value; and if the detected value differs from the expected value, identify the computing device as being in an inconsistent use mode.

According to some examples, a computer-readable storage medium having instructions stored thereon for identifying inconsistent use of computing devices is provided. The instructions may include: determining an expected value for a physical attribute of a computing device based on an operational mode of the computing device; monitoring the physical attribute of the computing device to detect a present value; and if the detected value differs from the expected value, identifying the computing device as being in an inconsistent use mode.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
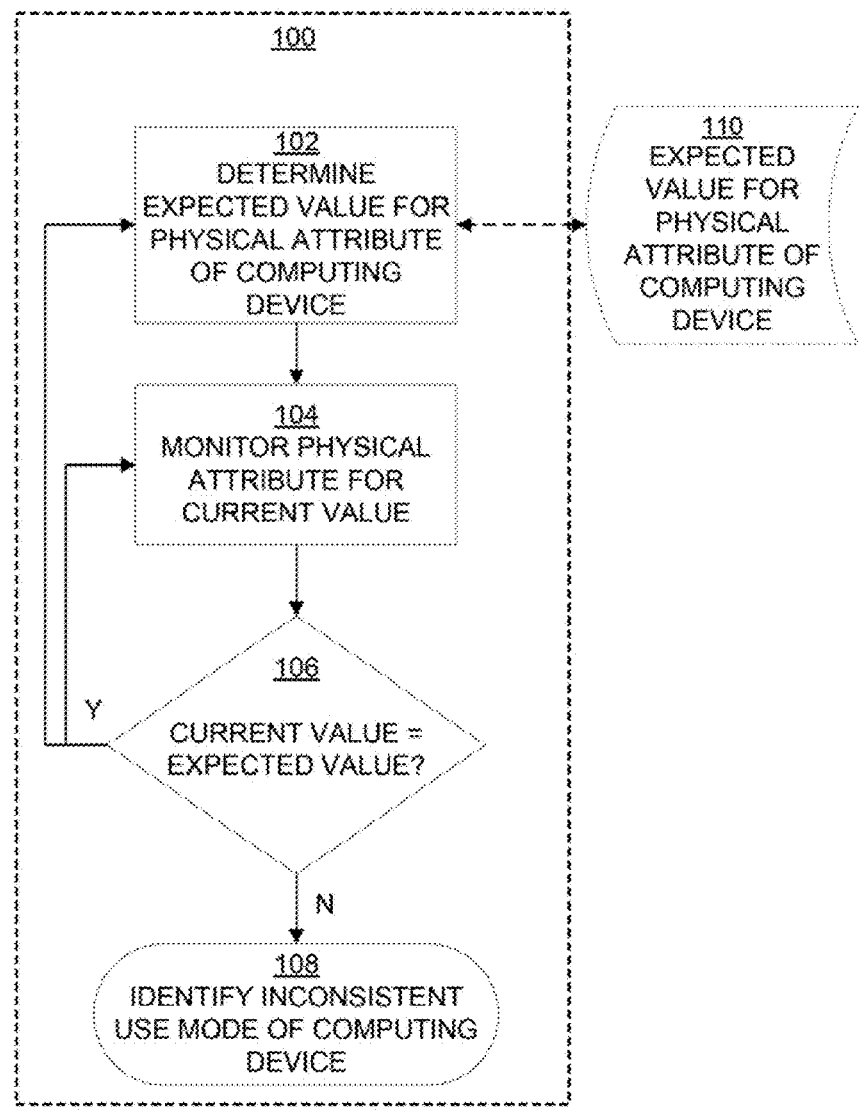
FIG. 1 is a flow diagram illustrating an example method for identifying inconsistent use of computing devices in a multiple computing device environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to identifying inconsistent use of computing devices in multiple computing device environment.

Briefly stated, technologies are presented for identifying inconsistent usage of computing devices in a multiple computing device environment. When software or hardware are compromised or faulty, the results of self-monitoring may be unreliable for determining inconsistent usage arising from a security breach, a hardware fault, or a software error. Computing devices may be independently monitored for physical attributes, such as temperature, vibration, emitted noise, etc., and such attributes may be compared to expected values based on computing load, network load, or the like. When the monitored and expected physical attribute values differ or conflict, possible inconsistent usage may be identified so that appropriate measures may be taken to rectify the situation.

FIG. 1 is a flow diagram illustrating an example method 100 for identifying inconsistent use of computing devices in a multiple computing device environment, arranged in accordance with at least some embodiments described herein. The example method may include one or more operations, functions or actions as illustrated by the blocks 102, 104, 106, 108, and/or 110. The operations described in the blocks 102 through 110 may also be stored as computer-executable instructions in a computer-readable medium such as a computer-readable medium 211B of a monitoring apparatus 209 of FIG. 2 described below.

The method 100 may begin with block 102, where an expected value of a physical attribute of a computing device based on an operational mode of the computing device is determined by the monitoring apparatus or a controller managing the monitoring apparatus, for example. Block 102 may be followed by block 104, where the physical attribute of the computing device is monitored to detect a present value for the physical attribute. Block 104 may be followed by block 106, where a determination is made by the monitoring apparatus or the controller managing the monitoring apparatus as to whether the detected present value differs from the expected value. If the detected value differs from the expected value, block 106 may be followed by block 108 where the computing device is identified as being in an inconsistent use mode by the monitoring apparatus or the controller managing the monitoring apparatus. If the detected value does not differ from the expected value, block 106 may be followed by block 108, where the method 100 may return to block 102 and a new expected value may be determined. Alternatively, the method 100 may return to block 104 and the physical attribute of the computing device may continue to be monitored. In determining whether the detected present value and the expected value differ, at block 106, a tolerance may be employed based on a type of the physical attribute, a detection accuracy of one or more sensors performing the monitoring, and/or environmental conditions. For example, in monitoring a temperature of the computing device a 1° C. tolerance may be used if the temperature sensors are capable of detecting that difference. On the other hand, a percentage based tolerance may be used for noise measurement in other examples.

The expected value for the physical attribute may be determined actively at block 102 (e.g., through a computation, calibration measurement, etc.). Alternatively, an optional database 110 of expected values for the physical attribute may be consulted at block 102. In some examples, the optional database 110 may be updated with the present value of the physical attribute at block 102, for example, as an ongoing process of collecting the present value. As discussed above, the expected value may be determined at block 102 through a calibration process that includes operating the computing device at a full operational load or a portion of the full operational load of the computing device. For example, the expected value may include any activity if the computing device is presently assigned no operations. The expected value may also be determined at block 102 based on a comparison of the present value with a previous value detected while performing a similar operation if the computing device is presently assigned a repetitive operation.

As used herein, the "physical attribute" may be any parameter based on an operational mode of the computing device in the multiple computing device environment. Examples of physical attributes may include values for temperature, vibration, noise, current consumption, voltage differential, power consumption, intentional electromagnetic emissions such as light from a disk or network activity light emitting diode (LED), unintentional electromagnetic emissions such as radio frequency waves emitted from an active component, an activity pattern such as a change in speed of a hard drive or a cooling fan, and the like. The physical attributes may be measured by the computing device and may be measured independently of any software or hardware of the computing device. For example, the physical attribute may be a processor temperature, and the expected value of the processor temperature may be measured by a software query of a temperature sensor built into the processor. In the event of inconsistent use of the computing device, such as through a security breach or a hardware or software fault, the expected value of the processor temperature may differ from the present value of the processor temperature as measured independently from the computing device.

In some examples, the physical attribute of the computing device may be monitored through a mobile device that includes at least a portion of sensors configured to detect the present value. The mobile device may also include a communication module configured to communicate with another portion of the sensors integrated on computing devices in the multiple computing device environment. The mobile device may be, for example, a smart phone, a laptop computer, a tablet computer, a special purpose controller, or the like. The physical attribute of the computing device may also be monitored through a stationary computing device that includes a communication module configured to communicate with sensors integrated on computing devices in the multiple computing device environment.

As used herein, the "present value" may be a singular detected value or a series of detected values. The "present value" may be associated with or a function of time, another physical attribute, and/or the operational mode of the computing device. For example, the "present value" may be a record of temperature versus time, a record of temperature versus network activity, a record of temperature versus processor load, or the like.

As used herein, the "expected value" may be a singular value or a series of values. The "expected value" may be associated with or a function of time, another physical attribute, and/or the operational mode of the computing device. In some examples, the "expected value" may be determined by polling hardware and/or software activity functions of the computing device. For example, the "expected value"

of temperature for a processor in the computing device may be obtained from an on-processor thermocouple, as reported by an administrative program running on the processor. In some examples, the "expected value" may also be determined from a historical record, a predictive model, or the like. For example, the "expected value" of temperature for the processor in the computing device may be obtained by determining a processing load as reported by the administrative program running on the processor, and consulting a historical record or predictive model of processor temperature versus processor load.

As used herein, the phrase "differ from" means that the present value may be greater or less than the expected value. In some examples, where the present value may be a series of detected values, such as a series of temperature versus time, the expected value may differ by being greater or lesser at any value in the series. The extent to which a difference between the present value and the expected value may constitute inconsistent use of the computing devices may be determined as desired, for example as a predetermined threshold difference. For example, where it is desirable to keep a close watch on possible security breaches, the predetermined threshold difference may be reduced. In some examples, where there may be an undesirable level of "false alarms" for inconsistent use of the computing devices, the predetermined threshold difference may be increased.

As used herein, the "multiple computing device environment" may be configured as any computing environment that includes a collection of the computing devices arranged in a networked configuration. Examples of the multiple computing device environments may include a data center, an enterprise computing device collection, a home network, a server farm, a grid computing system, a computing cluster, a parallel cluster, and/or a cloud computing center.

As used herein, the "inconsistent use mode" may be any operational mode of the computing device or a component of the computing device that is outside of expected behavior of the computing device. For example, the method may include identifying the computing device as being in the inconsistent use mode based on an unexpected central processing unit (CPU) usage. The inconsistent use mode may arise from a security breach, a software error, and/or a hardware error. In some examples, the inconsistent use mode may include combinations of the preceding, for example, a software error or security breach may lead to an overuse condition, which causes a temperature overload leading to a hardware error.

Figure 2:
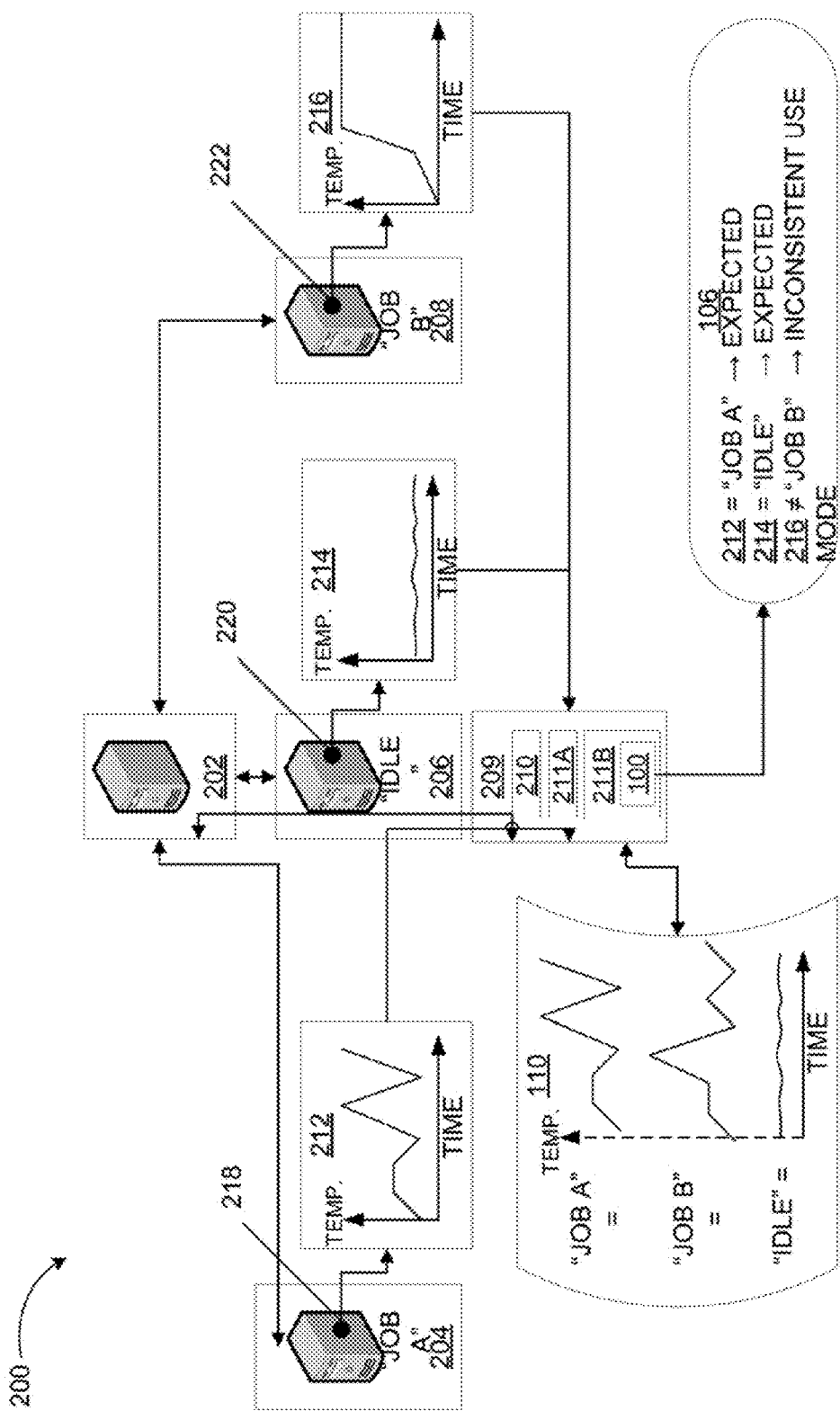
FIG. 2 is a conceptual illustration of a scheme for identifying inconsistent use of computing devices using sensors directed to each computing device.

FIG. 2 is a conceptual illustration of a scheme for identifying inconsistent use of computing devices using sensors directed to each computing device, arranged in accordance with at least some embodiments described herein. As shown in a diagram 200, a collection of computing devices 202, 204, 206 and 208 (e.g., servers) may operate in a data center, as enterprise desktops, as networked home computers, or in a similar configuration. As in any environment with multiple computing device, some or all of the devices may be susceptible to malicious activity or other unintended use scenario due to hardware or software malfunction, which may be difficult to detect given the multitude of computers and their physical distribution. The monitoring apparatus 209 may include a processor 210 coupled to a memory 211A, and may be configured with the computer readable medium 211B on which are stored computer-executable instructions for carrying out the example method 100. The monitoring apparatus 209 may be coupled to a collection of sensors 218, 220, and 222, respectively located at computing devices 204, 206, and 208.

The sensors 218, 220, and 222 may be, for example, thermal sensors, electromagnetic radiation sensors, current sensors, voltage sensors, power sensors, light sensors coupled to a LED activity light, vibration or sound sensors coupled to a power supply fan, or the like. In some examples, the sensors may be configured to measure the physical attribute as a value of the computing device, for example, an overall temperature value. In other examples, the sensors may be configured to measure the physical attribute as a value of a component of the computing device, for example, a processor temperature or a motherboard current consumption. In various examples, each of the sensors may be configured as: an integrated internal sensor, an added internal sensor, an, external sensor, and a long range sensor. In some examples, the sensors may be long range sensors, such as an infrared imaging device or an electromagnetic radiation sensor, and may be located away from the computing devices. For example, one or more infrared cameras may be used in a multiple computing device environment to monitor the temperature of the computing devices from a distance. In another example, one or more radio frequency sensors may be used in multiple computing device environment to monitor unintentional electromagnetic emissions from the computing devices from a distance.

The monitoring apparatus 209 may determine the operational modes of the computing devices 204, 206, and 208, for example by polling the computing devices 204, 206, and 208 andfor an optional managing server, e.g. the computing device 202. The operational modes in the example of FIG. 2 may be processor loads on the computing devices 204, 206, and 208. The monitoring apparatus 209 may determine the expected value at the sensors 218, 220, and 222, for example, processor temperature as a function of the processor loads. For example, the monitoring apparatus may consult the database 110 to query example expected temperature values versus various processor loads, e.g., associated with "JOB A" at the computing device 204, "IDLE" at the computing device 206, and "JOB B" at the computing device 208. The monitoring apparatus may compare present temperature values 212, 214, and 216 respectively measured at the collection of the sensors 218, 220, and 222 with the expected temperature values for "JOB A", "IDLE" and "JOB B". For example, the result of the comparison at block 106 illustrates that the present temperature values 212 and 214 respectively match the expected temperature values for "JOB A" at the computing device 204 and for "IDLE" at the computing device 206. However, because the present temperature value 216 differs from the expected value for "JOB B", an inconsistent use mode is identified at block 108 for the corresponding computing device 208.

Figure 3:
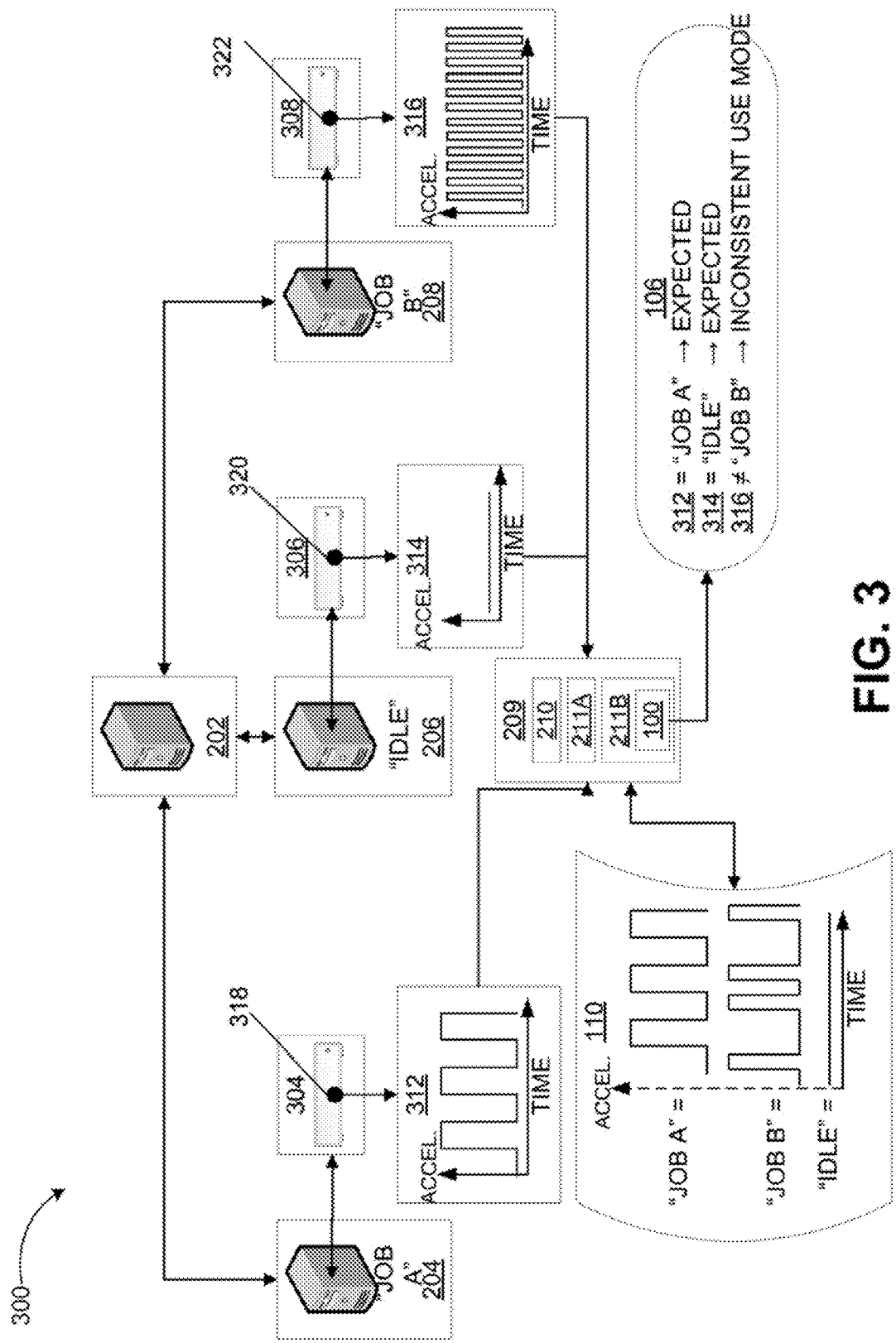
FIG. 3 is a conceptual illustration of a scheme for identifying inconsistent use of computing devices using sensors directed to components such as hard drives.

FIG. 3 is a conceptual illustration of a scheme for identifying inconsistent use of computing devices using sensors directed to components such as hard drives, arranged in accordance with at least some embodiments described herein. As shown in a diagram 300, the collection of computing devices 202, 204, 206 and 208 may operate in one of the multiple computing device environments discussed previously. Similar to FIG. 2, the monitoring apparatus 209 may include the processor 210 coupled to the memory 211A, and may be configured with the computer readable medium 211B on which are stored computer-executable instructions for carrying out the example method 100. The monitoring apparatus 209 may be coupled to a collection of sensors 318, 320, and 322, respectively located at a collection of hard drives 304, 306, and 308 that are coupled respectively to the computing devices 204, 206, and 208.

The sensors 318, 320, and 322 may be, for example, thermal sensors, electromagnetic radiation sensors, current sensors, voltage sensors, power sensors, light sensors coupled to a LED activity light, vibration or sound sensors coupled to a power supply fan, an accelerometer configured to measure hard drive acceleration, or the like. The sensors may be configured to identify the computing device as being in the inconsistent use mode based on an unexpected hard drive activity, where the physical attribute is a light emitting diode (LED) activity on the computing device, a hard drive current consumption, a vibration due to hard drive acceleration, and/or noise due to hard drive acceleration. In some examples, the vibration due to hard drive acceleration and/or the noise due to hard drive acceleration may be measured through an integrated sensor and an external sensor. In various examples, the external sensor may include an accelerometer and/or a microphone.

The monitoring apparatus 209 may determine the operational modes of the hard drives 304, 306, and 308, for example by polling the hard drives 304, 306, and 308; the computing devices 202, 204, 206 and 208; and/or the optional managing server, e.g. the computing device 202. The operational modes in the example of FIG. 3 may be, for example, hard drive random access loads on the hard drives 304, 306, and 308. The monitoring apparatus 209 may determine the expected value at the sensors 318, 320, and 322, for example, hard drive acceleration values as a function of the hard drive random access loads. For example, the monitoring apparatus may consult database 110 to query example expected hard drive acceleration values versus various hard drive random access loads, e.g., associated with "JOB A" at the computing device 204 and the hard drive 304, "IDLE" at the computing device 206 and the hard drive 306, and "JOB B" at the computing device 208 and the hard drive 308.

The monitoring apparatus may compare present hard drive acceleration values 312, 314, and 316 respectively measured at the collection of hard drive acceleration sensors 318, 320, and 322 with the expected hard drive acceleration values for "JOB A", "IDLE" and "JOB B". For example, the result of the comparison in block 106 illustrates that the present hard drive acceleration values 312 and 314 respectively match the expected hard drive acceleration values for "JOB A" at the computing device 204 and the hard drive 304 and for "IDLE" at the computing device 206 and the hard drive 306. However, because the present hard drive acceleration value 316 differs from the expected value for "JOB B", an inconsistent use mode is identified at block 108 for the corresponding computing device 208 and the hard drive 308.

Figure 4:
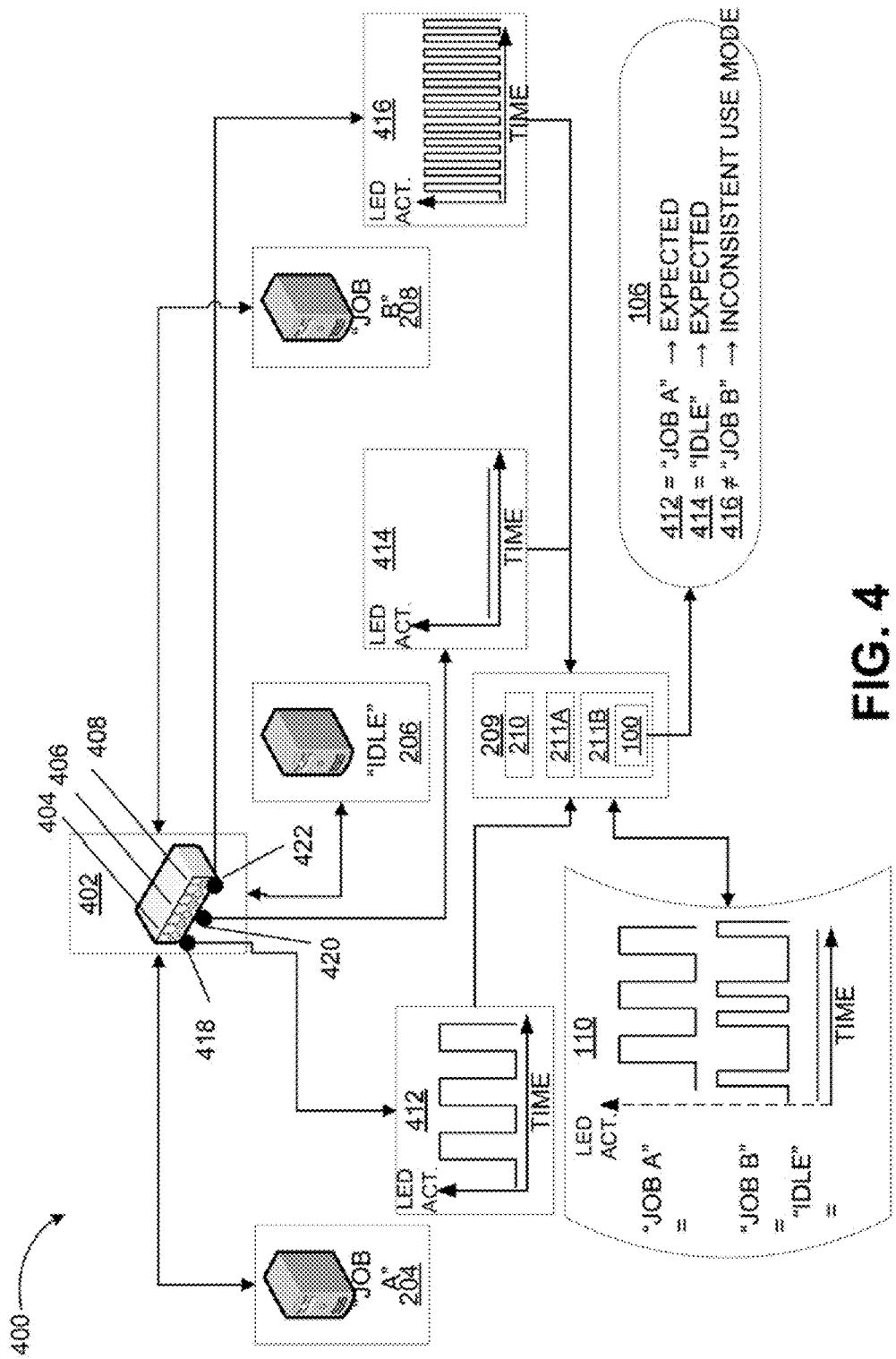
FIG. 4 is a conceptual illustration of a scheme for identifying inconsistent use of computing devices using sensors directed at a network.

FIG. 4 is a conceptual illustration of a scheme for identifying inconsistent use of computing devices using sensors directed, among other thing, at a network, arranged in accordance with at least some embodiments described herein. As shown in a diagram 400, the multiple computing device environment may include a collection of computing devices 202, 204, 206 and 208. Similar to FIG. 2 and FIG. 3, the monitoring apparatus 209 of FIG. 4 may include the processor 210 coupled to the memory 211A, and may be configured with the computer readable medium 211B on which are stored computer-executable instructions for carrying out the example method 100. The monitoring apparatus 209 may be coupled to a collection of sensors 418, 420, and 422 that may be configured to determine respective network activity for the computing devices 204, 206, and 208.

The sensors 418, 420, and 422 may be, for example, thermal sensors, electromagnetic radiation sensors, current sensors, voltage sensors, power sensors, light sensors coupled to a LED activity light, vibration or sound sensors coupled to a power supply fan, or the like. For example, the sensors 418, 420, and 422 may be light sensors and may be respectively located at a collection of network activity LEDs 404, 406, and 408 on a network switch 402 or similar network device associated with the computing devices 202, 204, 206, and 208. In another example, the sensors 418, 420, and 422 may be current sensors and may determine network activity as a function of current at the network switch 402.

The monitoring apparatus 209 may determine the operational modes of the computing devices associated with the network activity LEDs 404, 406, and 408, for example by consulting the optional managing server, e.g. the computing device 202. The operational modes in the example of FIG. 4 may be network activity loads for the computing devices 204, 206, and 208. The monitoring apparatus 209 may determine the expected value for the respective network activity light signals to be detected by the collection of light sensors 418, 420, and 422 as a function of the network activity loads. For example, the monitoring apparatus may consult database 110 to query example expected network activity values, e.g., associated with "JOB A" at the computing device 204 and the network activity LED 404, "IDLE" at the computing device 206 and the network activity LED 406, and "JOB B" at the computing device 208 and the network activity LED 408. The monitoring apparatus may compare the present network activity values 412, 414, and 416 respectively measured at the collection of light sensors 418, 420, and 422 with the expected network activity values for "JOB A", "IDLE" and "JOB B". For example, the result of the comparison in block 106 illustrates that the present network activity values 412 and 414 respectively may match the expected network activity values for "JOB A" at the computing device 204 and the network activity LED 404 and for "IDLE" at the computing device 206 and the network activity LED 406. However, because the present network activity value 416 differs from the expected value for "JOB B", an inconsistent use mode is identified at block 108 for the corresponding computing device 208.

Figure 5:
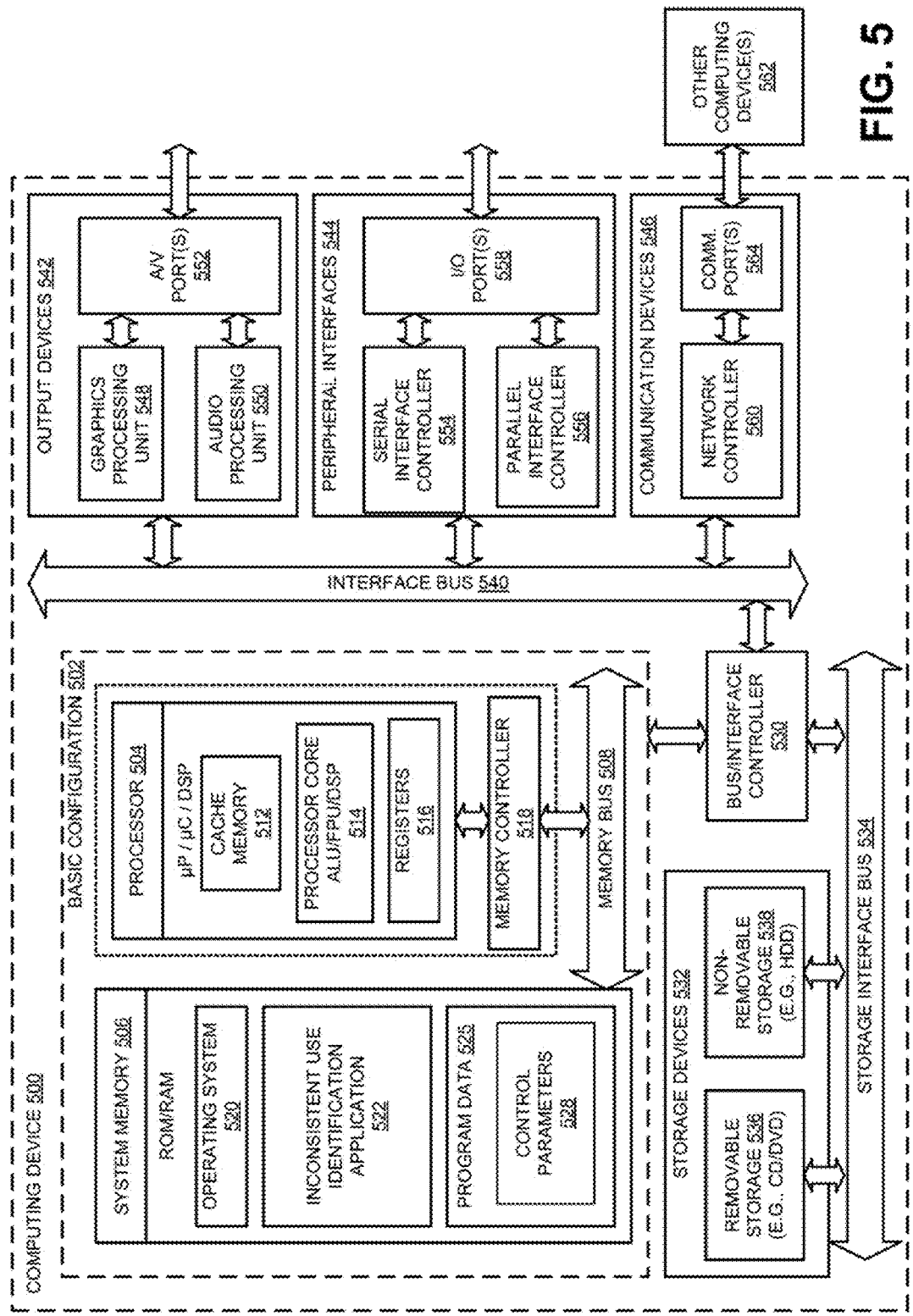
FIG. 5 is a block diagram of a general purpose computing device, which may be used to implement example methods for identifying inconsistent use of computing devices in a multiple computing device environment.

FIG. 5 is a block diagram of a general purpose computing device 500, which may be used for identifying inconsistent use of computing devices in a multiple computing device environment, arranged in accordance with at least some embodiments described herein. The general purpose computing device 500 may represent the monitoring apparatus 209, the computing devices 202, 204, 206, and 208, and the like. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more monitoring applications 522 configured to monitor physical attributes of computing devices and determine inconsistent usage (e.g. a security breach) based on the comparison, and program data 525. The program data 525 may include, among other data, one or more control parameters 528 such as control parameters for configuring or controlling the sensors, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), tape drives, and the like. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include: other monitoring devices, servers, and the like, as described herein.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented in any suitable configuration, for example, as a part of a general purpose or specialized server, a server farm, a grid computing system, a computing cluster, a parallel cluster, a cloud computing center, a mainframe, or the like that includes any of the above functions. The computing device 500 may also be implemented as a personal computer including both laptop computer and non-laptop computer configurations.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
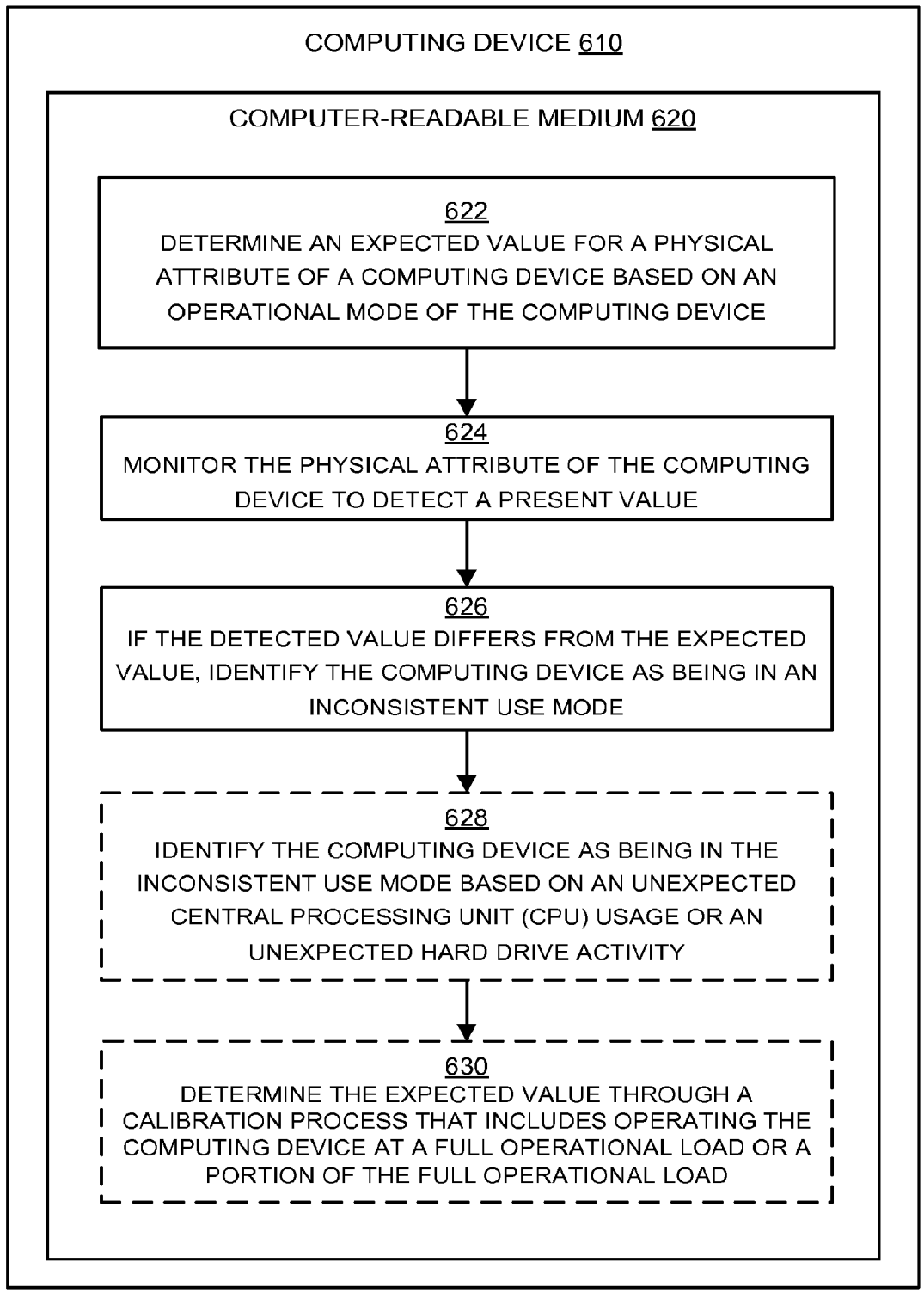
FIG. 6 is a flow diagram illustrating an example method for identifying inconsistent use of computing devices in a multiple computing device environment.

FIG. 6 is a flow diagram illustrating an example method for identifying inconsistent use of computing devices that may be performed by a computing device such as the computing device 500 in FIG. 5 or the computing device 610 in FIG. 6, arranged in accordance with at least some embodiments described herein. Example methods may include one or more operations, functions or actions as illustrated by blocks 622, 624, 626, 628, and/or 630. The operations described in the blocks 622 through 630 may also be stored as computer-executable instructions in a computer-readable medium 620 such as a computer-readable medium 706.

An example process for identifying inconsistent use of computing devices may begin with block 622, "DETERMINE AN EXPECTED VALUE FOR A PHYSICAL ATTRIBUTE OF A COMPUTING DEVICE BASED ON AN OPERATIONAL MODE OF THE COMPUTING DEVICE". The physical attribute may be, for example, values for temperature, vibration, noise, current consumption, voltage differential, power consumption, intentional electromagnetic emissions such as light from a disk or network activity light emitting diode (LED), unintentional electromagnetic emissions such as radio frequency waves emitted from an active component, an activity pattern such as a change in speed of a hard drive or a cooling fan, and the like, as described herein. Each computing device may be, for example, one of the computing devices 202, 204, 206, and/or 208, or the like.

Block 622 may be followed by block 624, "MONITOR THE PHYSICAL ATTRIBUTE OF THE COMPUTING DEVICE TO DETECT A PRESENT VALUE." The present value of the physical attribute may be a singular value, or may be a series of values collected as a function of time or as a function of another physical attribute, or the like, as described herein. The present value may be associated with the operational mode of the computing device, for example, the present value may be a processor temperature, which may be associated with a reported or expected processor load.

Block 624 may be followed by block 626, "IF THE DETECTED VALUE DIFFERS FROM THE EXPECTED VALUE, IDENTIFY THE COMPUTING DEVICE AS BEING IN AN INCONSISTENT USE MODE." The inconsistent mode may be identified as, for example, a security breach, a software error, a hardware fault, or the like, as described herein.

Block 626 may be followed by block 628, "IDENTIFY THE COMPUTING DEVICE AS BEING IN THE INCONSISTENT USE MODE BASED ON AN UNEXPECTED CENTRAL PROCESSING UNIT (CPU) USAGE OR AN UNEXPECTED HARD DRIVE ACTIVITY." Block 628 may be followed by optional block 630, "DETERMINE THE EXPECTED VALUE THROUGH A CALIBRATION PROCESS THAT INCLUDES OPERATING THE COMPUTING DEVICE AT A FULL OPERATIONAL LOAD OR A PORTION OF THE FULL OPERATIONAL LOAD." The identification process in block 628 and the calibration process in optional block 630 may be carried out on the monitoring apparatus 209, in conjunction with the computing devices 204, 206, and 208, and/or the optional management server 202.

The operations included in the above described process are for illustration purposes. Identifying inconsistent use of computing devices may be implemented by similar processes with fewer or additional operations, for example, employing operations depicted in FIG. 1. In some examples, the operations may be performed in a different order. In some other examples, various operations may be eliminated. In still other examples, various operations may be divided into additional operations, or combined together into fewer operations.

Figure 7:
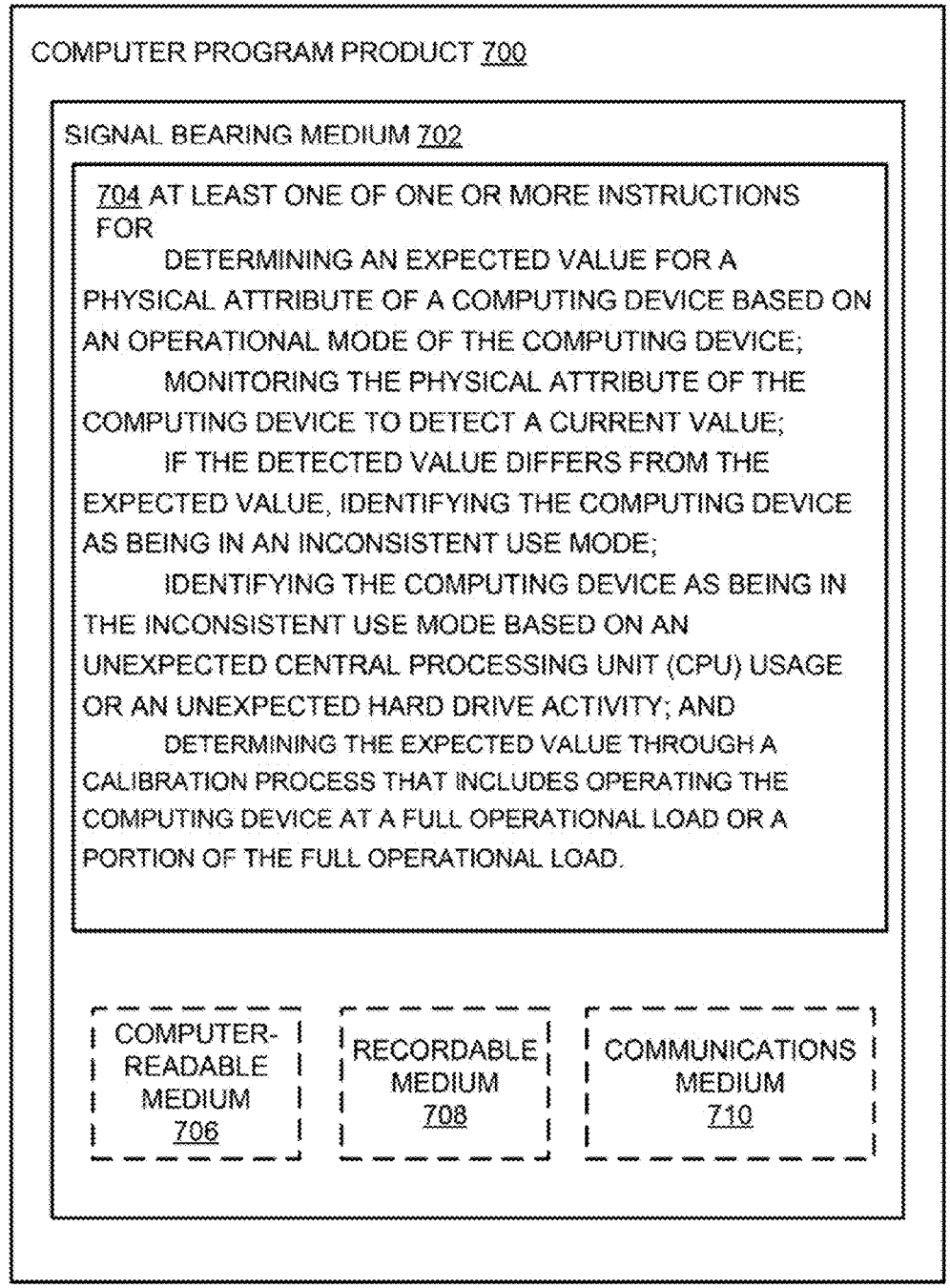
FIG. 7 illustrates a block diagram of an example computer program product including instructions for identifying inconsistent use of computing devices in a multiple computing device environment, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, one or more of the tasks shown in FIG. 7 may be undertaken in response to the instructions 704 conveyed to the processor 504 by the signal bearing medium 702 to perform actions associated with managing resources for a multiple computing device environment as described herein. Some of those instructions may include, for example, "determining an expected value for a physical attribute of a computing device based on an operational mode of the computing device;" "monitoring the physical attribute of the computing device to detect a current value;" "if the detected value differs from the expected value, identifying the computing device as being in an inconsistent use mode;" "identifying the computing device as being in the inconsistent use mode based on an unexpected central processing unit (CPU) usage or an unexpected hard drive activity;" "determining the expected value through a calibration process that includes operating the computing device at a full operational load or a portion of the full operational load"; and the like, according to embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 404 by an RF signal bearing medium, where the signal bearing medium 702 is conveyed by the wireless communications medium 710 (e.g., a wireless communications medium conforming with the IEEE 802.11 standard).

According to some examples, a method for identifying inconsistent use of computing devices is provided. The method may include: determining an expected value for a physical attribute of a computing device based on an operational mode of the computing device; monitoring the physical attribute of the computing device to detect a present value; and if the detected value differs from the expected value, identifying the computing device as being in an inconsistent use mode.

In other examples of the method, the inconsistent use mode may represent a security breach, a software error, and/or a hardware error. The method may further include identifying the computing device as being in the inconsistent use mode based on an unexpected central processing unit (CPU) usage and/or an unexpected hard drive activity, where the physical attribute may be one or more of: a light emitting diode (LED) activity on the computing device, a hard drive current consumption, a motherboard current consumption, a vibration due to hard drive acceleration, and noise due to hard drive acceleration. The hard drive current consumption and/or the motherboard current consumption may be measured through an integrated sensor and/or an external sensor.

In further examples of the method, the vibration due to hard drive acceleration and/or the noise due to hard drive acceleration may be measured through an integrated sensor and/or an external sensor. The external sensor may include an accelerometer and/or a microphone. The physical attribute may be a temperature of the computing device and/or a component of the computing device. The temperature may be detected through an integrated internal sensor, an added internal sensor, an external sensor, and/or an infrared imaging device.

In yet other examples of the method, the physical attribute may be an unintentional electromagnetic emission from the computing device and/or a component of the computing device. The physical attribute may also be a network activity. The network activity may be detected based on an LED activity and/or a current consumption of a network switch associated with the computing device. The multiple computing device environment may be a server farm, a grid computing system, a computing cluster, a parallel cluster, and/or a cloud computing center. The physical attribute of the computing device may be monitored through a mobile device that may include at least a portion of sensors configured to detect the present value and a communication module configured to communicate with another portion of the sensors integrated on computing devices in the multiple computing device environment.

In yet further examples of the method, the physical attribute of the computing device may be monitored through a stationary computing device that may include a communication module configured to communicate with sensors integrated on computing devices in the multiple computing device environment. The method may further include determining the expected value through a calibration process that may include operating the computing device at a full operational load or a portion of the full operational load of the computing device. The expected value may include any activity if the computing device may be presently assigned no operations. The expected value may be determined based on a comparison of the present value with a previous value detected while performing a similar operation if the computing device may be presently assigned a repetitive operation.

According to some examples, a monitoring apparatus for identifying inconsistent use of computing devices is provided. The monitoring apparatus may include a memory; and a processor coupled to the memory. The processor may be configured to: determine an expected value for a physical attribute of a computing device based on an operational mode of the computing device; monitor the physical attribute of the computing device to detect a present value; and if the detected value differs from the expected value, identify the computing device as being in an inconsistent use mode.

In various examples of the monitoring apparatus, the inconsistent use mode may represent a security breach, a software error, and/or a hardware error. In the monitoring apparatus, the processor may be further configured to: identify the computing device as being in the inconsistent use mode based on an unexpected central processing unit (CPU) usage and/or an unexpected hard drive activity, where the physical attribute may be a light emitting diode (LED) activity on the computing device, a hard drive current consumption, a motherboard current consumption, a vibration due to hard drive acceleration, and/or noise due to hard drive acceleration. The hard drive current consumption and/or the motherboard current consumption may be measured through an integrated sensor and/or an external sensor.

In further examples of the monitoring apparatus, the vibration due to hard drive acceleration and/or the noise due to hard drive acceleration may be measured through an integrated sensor and/or an external sensor. The external sensor may include an accelerometer and/or a microphone. The physical attribute may be a temperature of the computing device and/or a component of the computing device. The temperature may be detected through an integrated internal sensor, an added internal sensor, an external sensor, and/or an infrared imaging device.

In yet other examples of the monitoring apparatus, the physical attribute may be an unintentional electromagnetic emission from the computing device and/or a component of the computing device. The physical attribute may also be a network activity. The network activity may be detected based on an LED activity and/or a current consumption of a network switch associated with the computing device. The multiple computing device environment may be a server farm, a grid computing system, a computing cluster, a parallel cluster, and/or a cloud computing center. The monitoring apparatus may also be positioned on a mobile device and may further include at least a portion of sensors configured to detect the present value and a communication module configured to communicate with another portion of the sensors integrated on computing devices in the multiple computing device environment.

In yet further examples, the monitoring apparatus may be stationary and may further include a communication module configured to communicate with sensors integrated on computing devices in the multiple computing device environment. The processor may be further configured to: determine the expected value through a calibration process that may include operating the computing device at a full operational load and/or a portion of the full operational load of the computing device. The expected value may include any activity if the computing device may be presently assigned no operations. The expected value may be determined based on a comparison of the present value with a previous value detected while performing a similar operation if the computing device may be presently assigned a repetitive operation.

According to some examples, a computer-readable storage medium having instructions stored thereon for identifying inconsistent use of computing devices is provided. The instructions may include: determining an expected value for a physical attribute of a computing device based on an operational mode of the computing device; monitoring the physical attribute of the computing device to detect a present value; and if the detected value differs from the expected value, identifying the computing device as being in an inconsistent use mode.

In other examples of the computer-readable storage medium, the inconsistent use mode may represent a security breach, a software error, and/or a hardware error. The instructions may further include identifying the computing device as being in the inconsistent use mode based on an unexpected central processing unit (CPU) usage and/or an unexpected hard drive activity, where the physical attribute may be a light emitting diode (LED) activity on the computing device, a hard drive current consumption, a motherboard current consumption, a vibration due to hard drive acceleration, and/or noise due to hard drive acceleration. The hard drive current consumption and/or the motherboard current consumption may be measured through an integrated sensor and/or an external sensor.

In further examples of the computer-readable storage medium, the vibration due to hard drive acceleration and/or the noise due to hard drive acceleration may be measured through an integrated sensor and/or an external sensor. The external sensor may include an accelerometer and/or a microphone. The physical attribute may be a temperature of the computing device and/or a component of the computing device. In some examples, the temperature may be detected through an integrated internal sensor, an added internal sensor, an external sensor, and/or an infrared imaging device.

In yet other examples of the computer-readable storage medium, the physical attribute may be an unintentional electromagnetic emission from the computing device and/or a component of the computing device. The physical attribute may also be a network activity. The network activity may be detected based on an LED activity and/or a current consumption of a network switch associated with the computing device. The multiple computing device environment may be a server farm, a grid computing system, a computing cluster, a parallel cluster, and/or a cloud computing center. The physical attribute of the computing device may be monitored through a mobile device that may include at least a portion of sensors configured to detect the present value and a communication module configured to communicate with another portion of the sensors integrated on computing devices in the multiple computing device environment.

In yet further examples of the computer-readable storage medium, the physical attribute of the computing device may be monitored through a stationary computing device that may include a communication module configured to communicate with sensors integrated on computing devices in the multiple computing device environment. The instructions may further include determining the expected value through a calibration process that may include operating the computing device at a full operational load and/or a portion of the full operational load of the computing device. The expected value may include any activity if the computing device may be presently assigned no operations. The expected value may be determined based on a comparison of the present value with a previous value detected while performing a similar operation if the computing device may be presently assigned a repetitive operation.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular sensors, computing devices, components, networks, or multiple computing device environments, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to identify inconsistent use of a computing device, the method comprising:
   determining an expected value for a physical attribute by a processor of the computing device through a process that polls one or more hardware functions and one or more software functions of the computing device based on an operational mode of the computing device;
   polling an activity of the computing device to determine the expected value if the computing device is presently assigned no operations, wherein the activity includes one or more of a network activity and a hard drive activity of the computing device;
   monitoring the physical attribute of the computing device to detect a present value of the physical attribute through a mobile device that includes a portion of one or more sensors configured to detect the present value and a communication module configured to communicate with another portion of the one or more sensors integrated on the computing device in a multiple computing device environment;
   determining a difference between the detected present value and the expected value, the difference being larger than a tolerance value, wherein the tolerance value is based on one or more of a type of the physical attribute and a detection accuracy of the one or more sensors; and
   utilizing the processor of the computing device to identify the computing device as being in an inconsistent use mode.

2. The method of claim 1, wherein the inconsistent use mode determined by the processor of the computing device represents one or more of: a security breach, a software error, and a hardware error.

3. The method of claim 1, further comprising:
   utilizing the processor coupled to the one or more sensors integrated on the computing device to identify the computing device as being in the inconsistent use mode based on one or more of an unexpected central processing unit (CPU) usage and an unexpected hard drive activity, wherein the physical attribute is one or more of: a light emitting diode (LED) activity on the computing device, a hard drive current consumption, a motherboard current consumption, a vibration due to a hard drive acceleration, and noise due to the hard drive acceleration.

4. The method of claim 3, wherein one or more of: the hard drive current consumption and the motherboard current consumption are measured through one or more of an integrated sensor and an external sensor.

5. The method of claim 3, wherein one or more of the vibration due to hard drive acceleration and the noise due to hard drive acceleration are measured through one or more of an integrated sensor and an external sensor comprising one or more of an accelerometer and a microphone.

6. The method of claim 1, wherein the physical attribute is one of:
   a temperature of one or more of the computing device and a component of the computing device, and wherein the temperature is detected through one or more of: an integrated internal sensor, an added internal sensor, an external sensor, and an infrared imaging device;
   an unintentional electromagnetic emission from one or more of the computing device and a component of the computing device; and/or the network activity, and wherein the network activity is detected based on one or more of an LED activity and a current consumption of a network switch associated with the computing device.

7. The method of claim 1, further comprising:
utilizing the processor of the computing device to determine the expected value through a calibration process that includes operating the computing device at one or more of a full operational load and a portion of the full operational load of the computing device.

8. A monitoring apparatus to identify inconsistent use of a computing device, the monitoring apparatus comprising:
a memory; and
a processor coupled to the memory, the processor configured to:
   determine an expected value for a physical attribute of the computing device through a process that polls one or more hardware functions and one or more software functions of the computing device based on an operational mode of the computing device in a multiple computing device environment comprising one or more of: a data center, an enterprise computing device collection, a home network, a server farm, a grid computing system, a computing cluster, a parallel cluster, and a cloud computing center;
   poll an activity of the computing device to determine the expected value if the computing device is presently assigned no operations, wherein the activity includes one or more of a network activity and a hard drive activity of the computing device;
   monitor the physical attribute of the computing device to detect a present value of the physical attribute through a mobile device that includes a portion of one or more sensors configured to detect the present value and a communication module configured to communicate with another portion of the one or more sensors integrated on the computing device in a multiple computing device environment;
   determine a difference between the detected present value and the expected value, the difference being larger than a tolerance value, wherein the tolerance value is based on one or more of a type of the physical attribute and a detection accuracy of the one or more sensors; and
   identify the computing device as being in an inconsistent use mode.

9. The monitoring apparatus of claim 8, wherein the physical attribute is one of:
   a temperature of one or more of the computing device and a component of the computing device, and wherein the temperature is detected through one or more of: an integrated internal sensor, an added internal sensor, an external sensor, and an infrared imaging device;
   an unintentional electromagnetic emission from one or more of the computing device and a component of the computing device; and/or
   the network activity, and wherein the network activity is detected based on one or more of an LED activity and a current consumption of a network switch associated with the computing device.

10. The monitoring apparatus of claim 8, wherein the monitoring apparatus further includes a communication module configured to communicate with the one or more sensors integrated on computing devices in the multiple computing device environment.

11. A method to identify inconsistent use of a computing device, the method comprising:
   determining an expected value for a physical attribute by a processor of the computing device through a process that polls one or more hardware functions and one or more software functions of the computing device based on an operational mode of the computing device through a calibration process that includes operating the computing device at one or more of a full operational load and a portion of the full operational load of the computing device;
   polling an activity of the computing device to determine the expected value if the computing device is presently assigned no operations, wherein the activity includes one or more of a network activity and a hard drive activity of the computing device;
   monitoring the physical attribute of the computing device to detect a present value of the physical attribute through a mobile device that includes a portion of one or more sensors configured to detect the present value and a communication module configured to communicate with another portion of the one or more sensors integrated on the computing device in a multiple computing device environment;
   determining a difference between the detected present value and the expected value, the difference being larger than a tolerance value, wherein the tolerance value is based a type of the physical attribute; and
   identifying the computing device as being in an inconsistent use mode by the processor of the computing device.

12. The method of claim 11, wherein the processor of the computing device is used to identify the inconsistent use mode represents one or more of: a security breach, a software error, and a hardware error.

13. The method of claim 11, further comprising:
   identifying the processor coupled to one or more sensors integrated on the computing device as being in the inconsistent use mode based on one or more of an unexpected central processing unit (CPU) usage and an unexpected hard drive activity, wherein the physical attribute is one or more of: a light emitting diode (LED) activity on the computing device, a hard drive current consumption, a motherboard current consumption, a vibration due to hard drive acceleration, and noise due to hard drive acceleration.

14. The method of claim 11, wherein the physical attribute is a temperature of one or more of the processor coupled to one or more sensors integrated on the computing device and a component of the computing device, and wherein the temperature is detected through one or more of: an integrated internal sensor, an added internal sensor, an external sensor, and an infrared imaging device.

15. The method of claim 11, wherein the physical attribute is an unintentional electromagnetic emission from one or more of the computing device and a component of the processor coupled to one or more sensors integrated on the computing device.

16. The method of claim 11, wherein the physical attribute is the network activity, and wherein the network activity is detected based on one or more of an LED activity and a current consumption of a network switch associated with the processor of the computing device.

17. The method of claim 11, wherein the processor of the computing device is in a multiple computing device environment comprising one or more of: a data center, an enterprise computing device collection, a home network, a server farm, a grid computing system, a computing cluster, a parallel cluster, and a cloud computing center.

18. The method of claim 17, wherein the physical attribute of the computing device is monitored through a mobile device that includes the processor coupled to a portion of one or more sensors integrated on the computing device configured to detect the present value and a communication module configured to communicate with another portion of the processor coupled to the one or more sensors integrated on the computing device in the multiple computing device environment.

19. The method of claim 17, wherein the physical attribute of the computing device is monitored through a stationary computing device that includes a communication module configured to communicate with one or more sensors integrated on the processor of the computing device in the multiple computing device environment.

20. The method of claim 11, wherein the expected value is determined based on a comparison of the present value with a previous value detected while performing a similar operation if the processor of the computing device is presently assigned a repetitive operation.

* * * * *